United States Patent [19]

Schlossberg

[11] 4,367,554

[45] Jan. 4, 1983

[54] HIGH PRESSURE, HIGH POWER, COMPACT LASER

[76] Inventor: Howard R. Schlossberg, 4811 Hercules Ct., Annandale, Va. 22003

[21] Appl. No.: 195,148

[22] Filed: Oct. 8, 1980

[51] Int. Cl.³ .............................................. H01S 3/03
[52] U.S. Cl. ....................................... 372/61; 372/64
[58] Field of Search ................... 331/94.5 G, 94.5 P, 331/94.5 C; 350/96.3; 372/61

[56] References Cited

U.S. PATENT DOCUMENTS

| | | | |
|---|---|---|---|
| 3,590,248 | 6/1971 | Chatterton | 350/96.3 |
| 3,815,047 | 6/1974 | Smith et al. | 331/94.5 C |
| 3,961,283 | 6/1976 | Abrams et al. | 331/94.5 C |
| 3,970,963 | 7/1976 | Chester | 331/94.5 C |
| 4,103,255 | 7/1978 | Schlossberg | 331/94.5 C |

Primary Examiner—William L. Sikes
Assistant Examiner—Léon Scott, Jr.
Attorney, Agent, or Firm—Donald J. Singer; Jacob N. Erlich

[57] ABSTRACT

A high pressure, high power, compact laser fabricated from a block of material which is highly transparent at the wavelength of operation. The transmitting block contains a multiplicity of channels along the longitudinal axes thereof, each channel being of such a minute cross-section that a laser medium located within each channel is incapable of independently sustaining a lasing action in a waveguide mode of operation. The multiplicity of channels, in combination, provide sufficient gain for a laser mode propagating within the transmitting material and totality of channels thereby providing an extremely large output from a laser having a minimal cross-sectional configuration.

7 Claims, 2 Drawing Figures

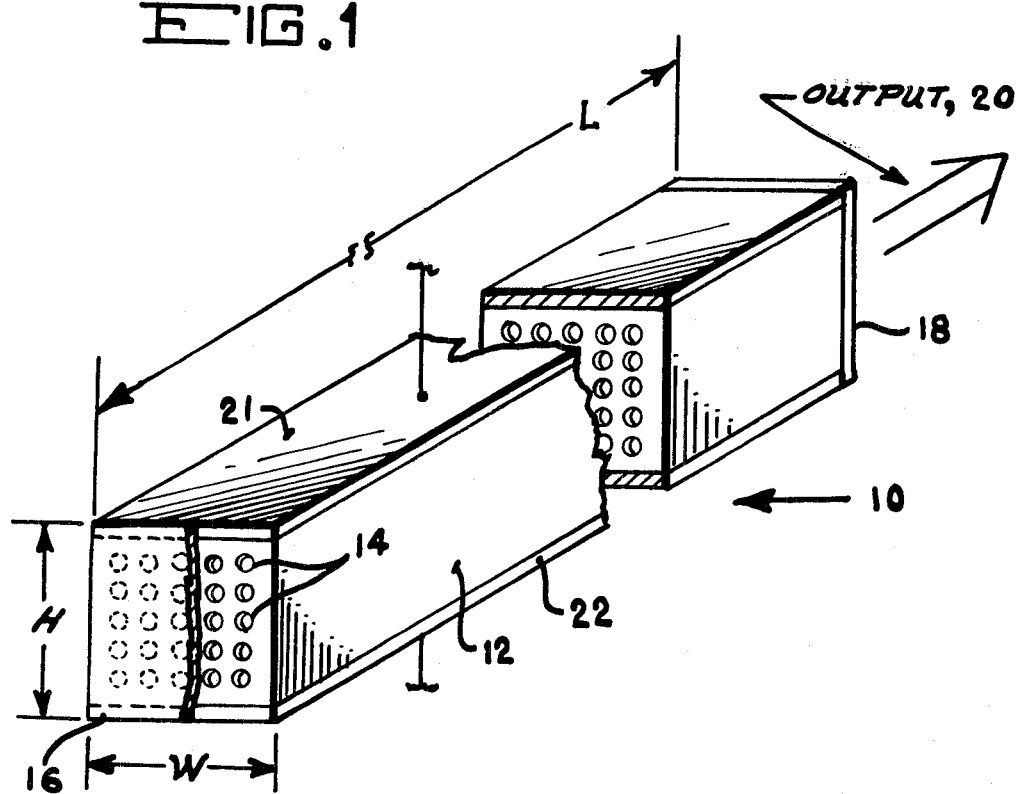
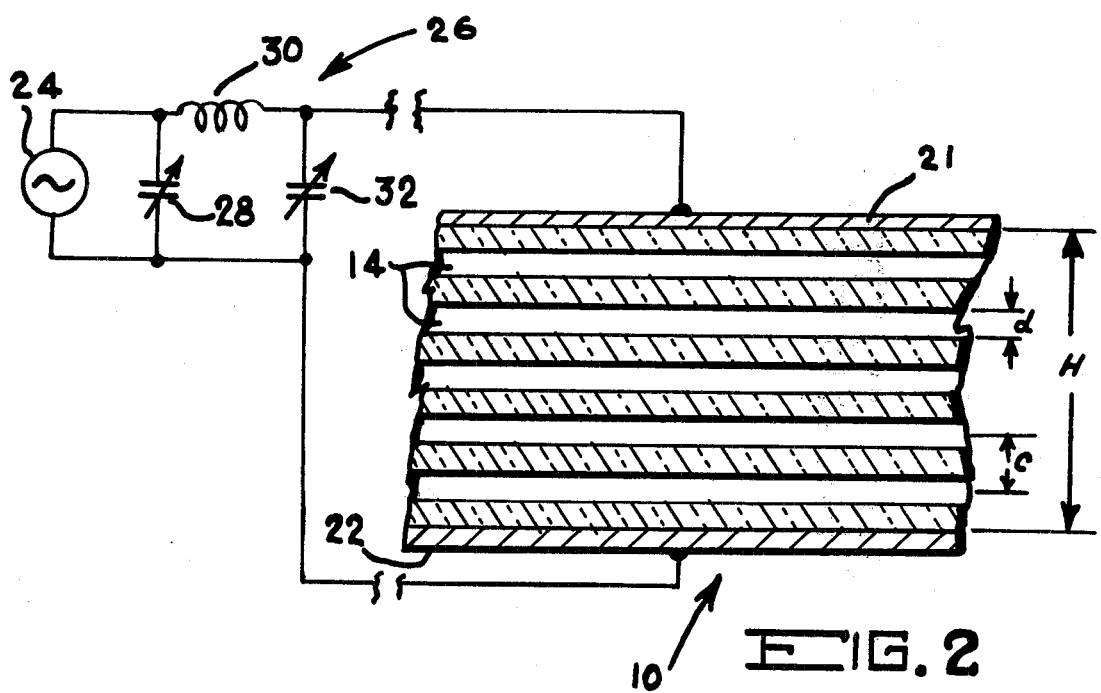

HIGH PRESSURE, HIGH POWER, COMPACT LASER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to lasers, and, more particularly to a gas laser which is extremely compact, lightweight and produces an exceptionally high power output.

Since the development of the first working lasers, considerable time and effort has been expended in the search for lightweight, compact, high output laser systems. The possible applications of such high power lasers are unlimited in the fields of communication, manufacturing and medicine. In particular, in the field of medicine and communication it is of utmost importance that the laser be lightweight and still produce high output.

Generally, the gas laser, and in particular, the $CO_2$ laser has been largely used in the above applications. Unfortunately, even though the gas laser produces a high output, there are many problems relating to its use. For example, the gas laser fails to be as compact and lightweight as required. Since it is essential within satellites, for example, that a laser utilized for communications does not add to the overall weight of the satellite, much research in this field is still underway. Furthermore, in the field of medicine which requires hand-held portable laser devices that are capable of providing precision and "bloodless" cutting, the basic gas laser still leaves much to be desired.

Overcoming many of the problems associated with the conventional gas laser as described hereinabove, is a laser which is more commonly known as a waveguide gas laser. The waveguide gas laser incorporates therein a resonator in which radiation is transmitted in part by guided wave (or more precisely a low loss leaky wave) propagation rather than by free space propagation. In other words, the waveguide laser is a laser which employs an optical resonator surrounding a waveguide to provide the necessary feedback to establish oscillation. This is in contrast to a conventional laser where the feedback and resonator modes are established by normal free space propagation, resulting in the well known Gaussian normal mode.

As pointed out in an article by Richard L. Abrams entitled "Waveguide Gas Lasers," *Laser Handbook*, vol. 3, pub. North Holland, 1979, since the power output per unit length and efficiency of most waveguide laser systems is independent of discharge diameter, these lasers give identical performance to conventional lasers. Consequently, the advantages to be gained over conventional lasers include: reduced laser size to smaller transverse dimensions; higher laser gain in doppler broadened lasers resulting in the potential for compact, low power lasers otherwise not possible; high pressure operations resulting in potential increased frequency tunability in molecular lasers such as $CO_2$; efficient matching between mode volume and laser excitation region; and, excellent mode control through the unique properties of waveguide laser resonators.

An example of an early form of a waveguide gas laser can be found in U.S. Pat. No. 3,772,611 issued Nov. 13, 1973. A greatly improved high power, compact waveguide gas laser is described in this inventor's U.S. Pat. No. 4,103,255 issued July 25, 1978.

The major drawback associated with the waveguide gas laser is that the waveguide laser has a limitation in its minimal transverse dimension in that it is incapable of operation if the waveguide resonator is sized below the waveguide mode of operation dimension, of, for example, 100 $\mu$'s. In addition, it is essential for waveguide laser operation that the waveguide resonator or channel be exceptionally straight. Any variance in the straightness thereof can void the laser operation.

Therefore, it is extremely desirable to produce a high pressure, high power, compact laser which incorporates therein all the advantages of the conventional gas laser or, more particularly, the waveguide gas laser, and yet eliminates the disadvantages associated therewith.

SUMMARY OF THE INVENTION

The instant invention overcomes the problems set forth in detail hereinabove by providing a compact high pressure, high power gas laser.

The gas laser of this invention completely eliminates the need for waveguiding within the resonant cavity and thereby is capable of providing a high pressure, high power, compact laser which is virtually unlimited in reducing the transverse dimension of the resonant cavity. Likewise, the laser of this invention eliminates the rigid requirement for extreme straightness in the laser channel.

The gas laser of this invention is made of a body fabricated from a block of material which is highly transparent at the desired wavelength of laser operation. The body or block contains therein a multiplicity of channels formed along the longitudinal axes of the body. Each channel is configurated of a cross-section so small as to be incapable of permitting laser operation by itself, i.e., the losses within the channel are too high to permit oscillation as a waveguide laser.

More specifically, within the concept of this invention, each channel contains a lasing medium therein, such as a standard laser gas mixture of $CO_2$, with the multiplicity of channels in combination providing gain for a laser mode of propagation within the transmitting material and totality of channels.

It has been established that in many gas laser systems, for example, the He:Ne and $CO_2$ lasers, the optimum pressure goes up as the diameter of the gas vessel decreases and the power density goes up with the optimum pressure. The conventional waveguide laser utilizes this concept in order to utilize small diameters in order to increase power, or to achieve a compact device which can be widely tuned due to pressure broadening at high pressure.

The instant invention provides a breakthrough in the laser field by achieving even higher pressures than those associated with waveguide lasers, since even smaller diameters or cross-section can be used. Consequently, much higher power output can be achieved, since the output for many of the small diameter gas channels or cells are essentially added together. In addition, since the laser of this invention does not rely upon the waveguide mode of operation the channels need not have the exceptional straightness associated with waveguide lasers.

Excitation of the gaseous laser medium within the channels of the laser of this invention is achieved by the utilization of a high frequency transverse discharge. Such a discharge is capable of providing the impetus for the lasing action to take place in the combination of lasing channels as well as achieving the benefits of increased operating life, reduced tendency towards laser gas dissociation, increased discharge stability and uniformity, increased operating efficiency, a significant lowering of required excitation voltages, and a substantial reduction in excitation hardware.

It is therefore an object of this invention to provide a laser which is capable of providing extremely high power output without operating as a waveguide laser.

It is another object of this invention to provide a high power, gas laser which is extremely compact and lightweight.

It is still another object of this invention to provide a high pressure, high power, compact laser which is economical to produce and which utilizes conventional, currently available components that lend themselves to standard, mass producing, manufacturing techniques.

For a better understanding of the present invention, together with other and further objects thereof, reference is now made to the following description taken in conjunction with the accompanying drawing and its scope will be pointed out in the appended claims.

DESCRIPTION OF THE DRAWING

FIG. 1 is a pictorial representation of the high pressure, high power, compact gas laser of this invention; and FIG. 2 is an enlarged, schematic cross-sectional, side-elevational view of the high pressure, high power, compact gas laser of this invention.

DETAILED DESCRIPTION OF THE PREFERRED EMBODIMENT

Reference is now made to FIG. 1 of the drawing which best shows the high pressure, high power, compact gas laser 10 of this invention. Laser 10 is formed of a body 12 made of a block of highly transmitting material 12 at a desired wavelength of laser operation, for example, 10.6 $\mu$m for a $CO_2$ laser or 0.633 $\mu$m for a He:Ne laser. Formed within body 12 of transmitting material are a multitude of small holes producing channels 14. Channels 14 are formed along the longitudinal axes or dimension of body 12. Since any suitable highly transmitting material may be utilized for body 12 of this invention, as stated above, in a $CO_2$ laser, body 12 would be transmitting material at 10.6 $\mu$m such as zinc selenide, cadmium telluride or an arsenic triselenide glass. It should be noted that body 12 is not limited to a single block of solid material but may be made of other configurations within the confines of this invention, such as a laminated structure having channels 14 formed between laminations.

An essential criteria for the gas laser 10 of this invention is that the diameter or cross-section of each of the channels 14 be extremely small. Again it should be pointed out that channels 14 are not limited to a cylindrical configuration having a diameter but may be of any suitable cross-section which meets the limitations set forth below. Consequently, the terms diameter and cross-section may be interchanged within the scope of this invention. More specifically, the diameter of channels 14 must be so small so that a lasing medium located within each channel 14 be incapable of lasing by itself within each channel in a waveguide mode. As a result, the overall cross-sectional dimensions of gas laser 10 of this invention is extremely small thereby producing a compact laser. A typical example of a diameter, d, of channel 14 may be, for example, 100 $\mu$m. Such a minute channel 14 can be made by drilling (e.g., ultrasonic), by other techniques such as chemical vapor deposition of the material on a set of wires or by extrusion of the crystalline or glass material. In addition, the centers between the channels, c, are extremely closely spaced together, as for example, the centers of adjacent channels 14 being spaced by approximately 200 $\mu$m or approximately twice the diameter of each channel 14.

Each end of body 12 as illustrated in FIG. 1 of the drawing is enclosed by a reflector element in the form of, for example, mirrors 16 and 18. Reflector element 16 may take the form of a highly reflecting substantially totally reflective mirror while reflector element 18 takes the form of a highly reflective partially transmitting mirror, that is, approximately 98% reflective so as to allow the laser output 20 to pass therethrough.

Typical dimensions for body 12 of laser 10 of this invention would be an overall length, L, of approximately 20 cm and a square cross-sectional configuration having a height, H, and a width, W, of approximately 4 mm each. It should, however, be realized that this invention is not limited to the above dimensions, with these dimensions being merely representative of a working embodiment of this invention. In addition, the cross-sectional configuration of this invention is not limited to a square.

Any suitable lasing gas medium in the form of a standard $CO_2$ laser gas mixture (e.g., 65% He, 22% $N_2$ and 13% $CO_2$ by mole fraction) fills each channel 14. It should, however, be noted that any other laser gas and/or gas mixture may also be employed with this invention, as long as the block of highly transmitting material of body 12 is transmissive at the desired gas laser wavelength.

The pressure of the laser gas mixture is made, for example, 1500 Torr. The laser 10 of this invention can be filled by, for example, placing body 12 in a cell, allowing the gas mixture into the cell at high pressure, pumping down the cell to 1500 Torr and sealing on reflector elements 16 and 18. Reflector elements 16 and 18 can be sealed on, for example, using a structure similar to a check valve in which the high pressure gas is forced into channel 14, but when the pressure in the cell is lowered, the 1500 Torr pressure in the channels pushes the reflector elements 16 and 18 against an O-ring (not shown) thereby preventing its escape. The channels 14 can also be connected by small holes, and conventional filling tube and reservoir techniques used to fill the gas.

Referring now to FIG. 2 of the drawing, excitation of the gas laser 10 of this invention takes place by a high frequency transverse discharge of the type, although not limited thereto, set forth in U.S. Pat. No. 4,169,251 issued Sept. 25, 1979. This laser excitation is accomplished by placing electrodes 21 and 22 on the top and bottom surfaces, respectively, of body 12. Electrodes 21 and 22 may be formed of any suitable metal such as aluminum. The electrodes 21 and 22 may be secured to body 12 by either mechanical or other suitable bonding means such as, for example, by the evaporization of the metal thereon. The entire assembly may be mounted on a block of material (not shown) having a high thermal conductivity, such as copper, in order to both enhance the heat removal and structural rigidity.

Any suitable AC voltage source 24 is coupled between electrodes 21 and 22 to supply the appropriate operating voltage which establishes an electric discharge in the laser gas sufficient to invert the population of the energy level of the desired laser transition. A coupling circuit 26 of the type illustrated in U.S. Pat. No. 4,169,251 may be employed to apply the AC excitation voltage between electrodes 21 and 22. Circuit 26 includes a first variable capacitor 28 connected in parallel with source 24, an inductor 30 connected between one terminal of source 24 and electrode 20, and a second variable capacitor 32 connected between electrode 21 and the other terminal of source 24 which, in turn, is electrically connected to the other electrode 22. The resultant high frequency transverse discharge excitation allows for the lasing medium within each of the channels 14 to interact so as to provide the appropriate lasing operation.

It should be well understood that the gas laser 10 of this invention does not operate in a waveguide mode, that is, each channel 14, which contains a lasing medium therein, is incapable of lasing by itself in a waveguide mode. It is the transmission through body 12 between channels 14, thereby creating a combination of channels, which allows for the lasing operation to take place. Consequently, the height, H, and width, W, of laser 10 are configured such that all the channels 14 lie within the dimension of one free space mode. In other words, designating the height, H, as equal to $2a$ and the width, W, in the case of a square cross-sectional dimension also equal to $2a$, results in the following relationship; $a^2/L\lambda \approx 1$. Although the above equation has been set forth with respect to a substantially square cross-sectional configuration for gas laser 10 of this invention, operation of laser 10 may also take place with a rectangular or other cross-sectional configuration as long as each dimension satisfies the equation $a^2/L\lambda \approx 1$.

By providing a gas laser 10 which does not rely upon the waveguide mode of operation, the strict requirement of absolute straightness the channels 14 is eliminated and therefore with the utilization of smaller diameter channels even higher pressures than in a waveguide laser can take place with this invention.

MODE OF OPERATION

Operation of the laser 10 of this invention takes place upon the excitation of the gas lasing medium located within channels 14 by the high frequency transverse discharge excitation. The RF at a frequency of, for example, approximately 200 MHZ breaks down the conventional $CO_2$ gaseous mixture (lasing mixture) contained in each of the multitude of channels 14. Since discharge characteristics (and laser gain and power per unit length) scale as the pressure times the channel diameter, the pressure in each of the channels 14 is proportionately raised from values normally used in waveguide lasers for optimum power output thereby guaranteeing that the RF applied power will result in a similar discharge. The RF power creates suitable discharges in all the channels 14, if the power is sufficient, there being no difficulty in RF penetrating each discharge because at the electron densities involved (which also scales as the diameter), the plasma frequency is much lower than 200 MHZ. Consequently, lasing action within laser 10 takes place by the interaction of the laser gas medium located within channels 14 through transmitting body 12. The output power for each channel 14 is the equivalent to the power from a single waveguide laser while the total output power is equal to the sum of the individual outputs thereby providing a high output power in the compact high pressure non-waveguide laser 10 of this invention.

Although this invention has been described with reference to a particular embodiment, it will be understood to those skilled in the art that this invention is also capable of a variety of alternate embodiments within the spirit and scope of the appended claims.

I claim:

1. A high pressure, high power, compact laser comprising at least two elongated channels formed along the longitudinal axes of a body of material highly transparent at the wavelength of operation, wherein each of said channels is incapable of independently sustaining a lasing action within each channel in a waveguide mode of operation, each of said channels being of a predetermined cross-section, means located at each end of said body for forming a resonant cavity therebetween, a gas lasing medium contained within each of said channels, and a means for initiating sufficient gain for a laser mode in the combination of said channels and said highly transparent body such that a high power, coherent output of electromagnetic radiation at said operating wavelength through one of said means at an end of said body.

2. A high pressure, high power, compact laser as defined in claim 1 wherein said body has a predetermined length and a square cross-section and wherein said channels are all located within a cross-sectional dimension of one free space mode, said free space mode being defined by the expression $a^2/L\lambda \approx 1$ where $a$ = one half the size of a side of said cross-section, L = length of said body and $\lambda$ = said operating wavelength.

3. A high pressure, high power, compact laser as defined in claim 1 wherein said means for initiating said lasing action is in the form of a high frequency transverse discharge.

4. A high pressure, high power, compact laser as defined in claim 3 wherein said body is made of a solid block of said material and said channels are formed therein.

5. A high pressure, high power, compact laser as defined in claim 4 wherein each of said channels have a circular cross-section of the same diameter and the centers thereof are spaced apart from each other approximately twice said diameter of said cross-section.

6. A high pressure, high power, compact laser as defined in claim 5 wherein said body has a predetermined length and a square cross-section, and wherein said said channels are all located within a cross-sectional dimension of one free space mode, said free space mode being defined by the expression $a^2/L\lambda \approx 1$ where $a$ = one half the size of a side of said cross-section, L = length of said body and $\lambda$ = said operating wavelength.

7. A high pressure, high power, compact laser as defined in claim 6 wherein said lasing action initiating means comprises a pair of electrodes located on opposite sides of said body parallel to the longitudinal axes of said body and a coupling circuit electrically connected to said pair of electrodes in order to apply excitation voltage between said electrodes.

* * * * *